(12) United States Patent
Kranz et al.

(10) Patent No.: US 9,541,160 B2
(45) Date of Patent: Jan. 10, 2017

(54) ANTI-BACKBEND CHAIN

(71) Applicant: IWIS Antriebssysteme GmbH & Co. KG, Munich (DE)

(72) Inventors: Christopher Kranz, Munich (DE); Orhan Sahin, Munich (DE)

(73) Assignee: IWIS ANTRIEBSSYSTEME GMBH & CO. KG, Munich (DE)

( * ) Notice: Subject to any disclaimer, the term of this patent is extended or adjusted under 35 U.S.C. 154(b) by 238 days.

(21) Appl. No.: 14/267,792

(22) Filed: May 1, 2014

(65) Prior Publication Data
US 2014/0329632 A1 Nov. 6, 2014

(30) Foreign Application Priority Data

May 3, 2013 (EP) .................................... 13002377

(51) Int. Cl.
*F16G 13/18* (2006.01)
*F16G 13/20* (2006.01)
*F16G 13/06* (2006.01)

(52) U.S. Cl.
CPC ............... *F16G 13/18* (2013.01); *F16G 13/06* (2013.01); *F16G 13/20* (2013.01)

(58) Field of Classification Search
CPC ........... F16H 13/06; F16H 13/18; F16H 13/20
USPC .................................................. 474/201–237
See application file for complete search history.

(56) References Cited

U.S. PATENT DOCUMENTS

| 2,466,639 | A | * | 4/1949 | Focke | F16G 13/06 |
| | | | | | 474/218 |
| 2,638,790 | A | * | 5/1953 | Perron | F16G 13/06 |
| | | | | | 411/513 |
| 6,558,281 | B1 | * | 5/2003 | Greiter | B21L 15/005 |
| | | | | | 474/219 |
| 6,662,545 | B1 | * | 12/2003 | Yoshida | B65G 17/065 |
| | | | | | 198/851 |
| 8,002,658 | B2 | | 8/2011 | Morishige et al. | |
| 2007/0042848 | A1 | * | 2/2007 | Grabmann | F16G 13/20 |
| | | | | | 474/202 |
| 2009/0124445 | A1 | | 5/2009 | Morishige et al. | |
| 2011/0192133 | A1 | * | 8/2011 | Veltrop | F16G 13/20 |
| | | | | | 59/78 |

(Continued)

FOREIGN PATENT DOCUMENTS

CN 2837608 Y 11/2006
CN 201475252 U 5/2010

(Continued)

OTHER PUBLICATIONS

Office Action in Chinese Patent Application No. 201410331118.2, dated Oct. 9, 2015.

*Primary Examiner* — William E Dondero
*Assistant Examiner* — Robert T Reese
(74) *Attorney, Agent, or Firm* — Baker and Hostetler LLP

(57) ABSTRACT

An anti-backbend chain comprises a plurality of alternate chain links joined by respective chain hinges, a spring element comprising at least a first spring arm being provided. The spring element rests on a chain hinge and the first spring arm extends to a neighbouring chain hinge and is movably in contact therewith under the biasing force of the spring element, so as to obstruct bending of the anti-backbend chain in a first pivot direction. In addition, an anti-backbend chain drive is provided, in particular a chain drive for driving automated door or gate systems.

20 Claims, 4 Drawing Sheets

(56) References Cited

U.S. PATENT DOCUMENTS

2011/0203248 A1* 8/2011 Mackert ............... A47C 1/025
59/84

FOREIGN PATENT DOCUMENTS

| | | |
|---|---|---|
| DE | 1046422 B1 | 12/1958 |
| DE | 1180318 B | 10/1964 |
| DE | 1450699 | 2/1971 |
| DE | 20102310 U1 | 4/2001 |
| DE | 10206274 A1 | 8/2003 |
| DE | 102005009154 A1 | 9/2006 |
| DE | 202007002767 U1 | 8/2008 |
| DE | 102011107047 A1 | 1/2013 |
| EP | 1744079 A1 | 1/2007 |
| JP | H06-33993 A | 2/1994 |
| JP | H07-172786 A | 7/1995 |
| SU | 492695 A1 | 11/1975 |

* cited by examiner

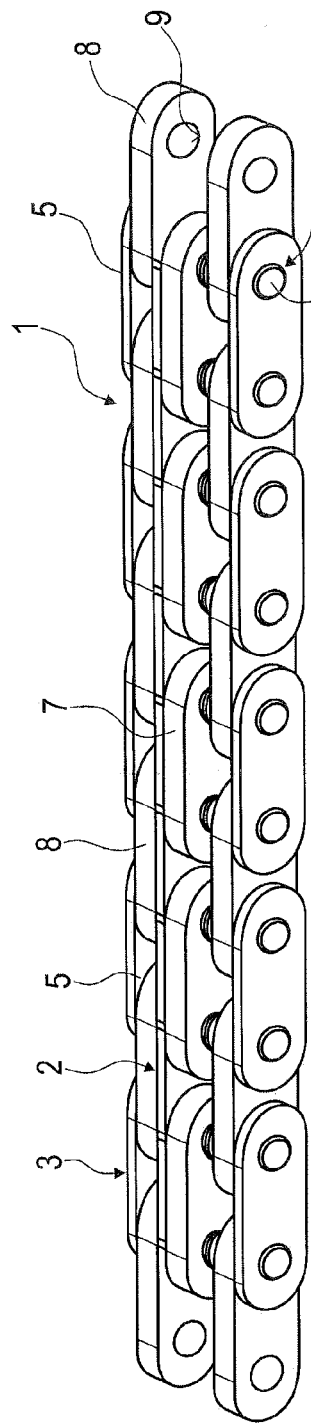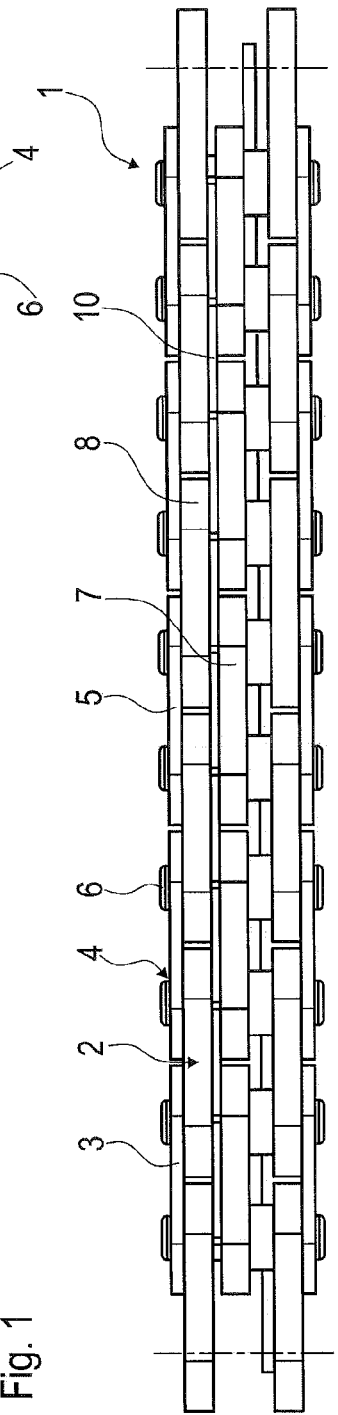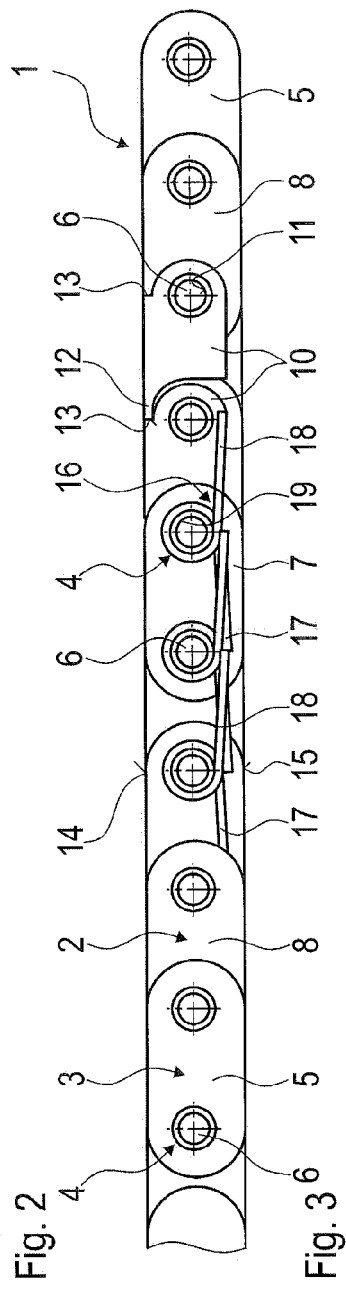
Fig. 1
Fig. 2
Fig. 3

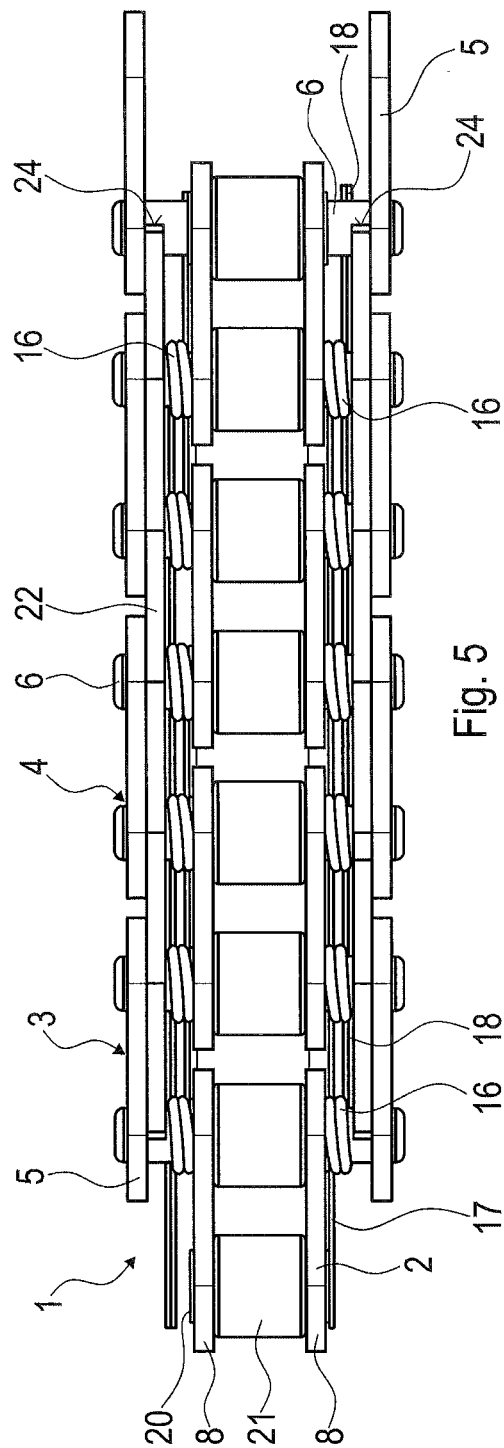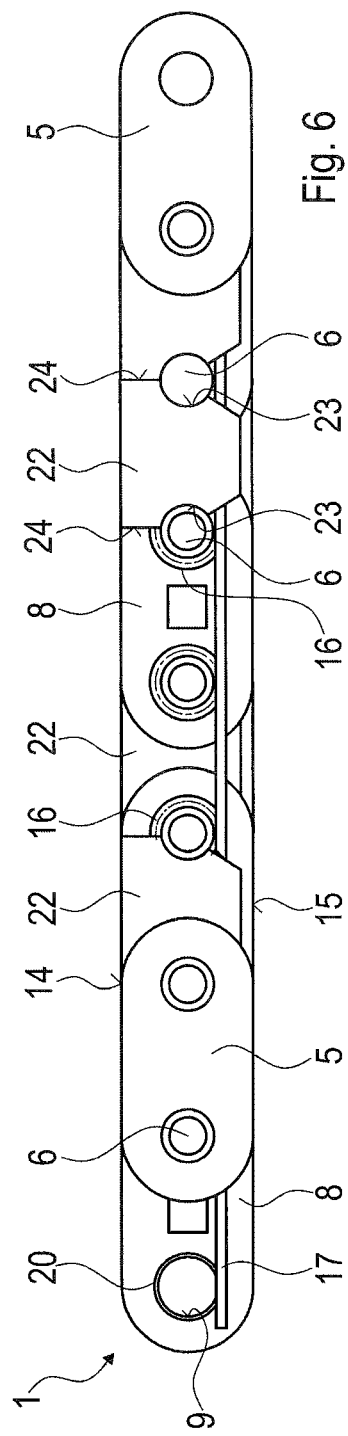

ANTI-BACKBEND CHAIN

CROSS-REFERENCE TO RELATED APPLICATION

This application claims priority to foreign European Patent Application EP 13002377.3, filed on May 3, 2013, the disclosure of which is incorporated herein by reference in its entirety.

FIELD OF THE INVENTION

The present invention relates to an anti-backbend chain, in particular for door and window drives, comprising a plurality of alternate chain links joined by respective chain hinges, and a stiffening means, which stiffens the anti-backbend chain in a first pivot direction, wherein a spring element comprising at least a first spring arm is provided, the spring element rests on a chain hinge, the first spring arm extends to a neighboring chain hinge and is movably in contact therewith under the biasing force of the spring element, so as to obstruct bending of the anti-backbend chain in a first pivot direction, the chain links are provided with chain link plates, and the chain link plates of neighboring chain links are joined via the chain hinge. The invention additionally relates to a corresponding chain drive with such an anti-backbend chain.

BACKGROUND

A chain with anti-backbend properties on the first and second sides is known from DE 10 2005 099 154 A1. In the case of this anti-backbend push chain for power transmission in a chain drive, the chain elements are pivoted radially inwards on a chain drive wheel. The hinge openings of the chain link plates are implemented as elongate holes and have a certain amount of play relative to the hinge pins, so that the effective chain pitch in the push strand is reduced. In addition, the ends of the hinge pins have rollers provided thereon, which guide the anti-backbend chain in a separate roller rail guide in the push strand. The hinge openings configured as elongate holes additionally allow a reliable contact of the stiffening contours formed on the end faces of the chain link plates in the push strand.

DE 1 450 699 C1 discloses a further anti-backbend chain. The outer link plates of the outer chain links and the inner link plates of the inner chain links have provided between them stiffening link plates, which are each arranged on a hinge pin and provided with a projection protruding in a direction of chain travel, the end faces of said projection being configured as support surfaces. One end face is configured as a protrusion and the other end face as a recess. The protruding and recessed end faces of the stiffening link plates stiffen the chain in a first pivot direction, whereas the chain remains flexible in the other, second pivot direction. Therefore, this chain runs in a push strand in a guide means so as to prevent, for power transmission through this anti-backbend chain, bending of the chain in the second pivot direction.

The prior art comprises a plurality of additional, very different structural designs of anti-backbend chains. Reference DE 1 180 318 B, for example, shows an anti-backbend chain drive with alternate inner and outer chain links, the contour of the chain link plates being provided with an end face-side stiffening means and the chain being guided between the chain link plates in a guide channel in a push strand. DE 2001 002 310 U1 discloses an anti-backbend chain with identical fork-shaped chain links provided with interengaging stiffening contours on their rear sides. In addition, EP 1 744 079 A1 discloses a chain with anti-backbend properties on the first and second sides, in the case of which the end faces of the chain link plates have complementary stiffening contours, at least one hinge opening being configured as an elongate hole so as to allow in the push strand a reliable interengagement of the end face-side stiffening contours by means of a reduced chain pitch.

Reference DE 1 046 422 B1 discloses a further anti-backbend plate link chain comprising a locking mechanism, which prevents the chain links from being pivoted relative to one another and which is disengaged by means of a lateral guide during deflection. A further locking mechanism of an anti-backbend chain is shown in DE 20 2007 002 767 U1, where an arresting element, which is pivotable transversely to the direction of chain travel, is disengaged by means of a guide rail.

The anti-backbend chains and chain drives known in the prior art make use of very different concepts and constructions so as to guarantee stiffening of the chain in the push strand and allow simultaneously deflection of the chain around a chain drive wheel. Many of the known anti-backbend chains are joined by additional measures after stiffening behind the chain drive wheel in the push strand or the chains are locked by means of arresting mechanisms in the second or in both pivot directions. Although many of the anti-backbend chains which have hitherto been used in the prior art proved to be very useful, the mechanisms used are partly complex stiffening and/or locking mechanisms as well as intricate constructions that often require additional space.

JP H07 172786 A deals with a lift chain for a forklift truck whose chain links can be biased relative to one another by means of a leg spring. Every second hinge pin has attached thereto such a leg spring, the two legs of said spring resting on the respective neighboring pin. The chain is therefore always forced back from a stretched position to the folded position.

US 2009/124445 A1 discloses a toothed chain comprising wire spring elements between the chain links. These wire spring elements are intended to make the chain resistant to bending.

GB 12985 A discloses a roller chain. Some of the chain links have upwardly protruding projections having a leaf spring element arranged thereon, which imparts to the chain a certain degree of spring elasticity.

SUMMARY OF THE INVENTION

It is therefore the object of the present invention to provide an anti-backbend chain as well as a chain drive, which allow reliable stiffening of the chain in the push strand on the basis of the simplest possible structural design of the chain and of the stiffening mechanism.

According to the present invention, this object is achieved by an anti-backbend chain according to claim 1. The spring element used here in the anti-backbend chain only obstructs bending of the chain in the first pivot direction, so that the chain, when operated in a pushing mode, can transmit sufficient power. The tendency of the anti-backbend chain according to the present invention to yield, when subjected to bending forces that act transversely to the pushing direction of the chain, is reduced in accordance with the spring force, so that, when deflected around a chain wheel, the chain will yield and can be passed around the chain wheel without releasing a locking mechanism or elongating the chain pitch. The anti-backbend chain is deflected around the chain wheel against the spring force of the spring element. Due to the elastic biasing force between neighboring chain hinges, the spring element additionally reduces the influence of vibrations and the polygon effect in the push strand of the anti-backbend chain, so that also comparatively small chain drive wheels can be used and operation in a vibration-prone region is possible.

The anti-backbend chain according to the present invention comprises a stiffening means, which stiffens the anti-backbend chain in the second pivot direction. When the anti-backbend chain is deflected only in the first pivot direction, such stiffening means allow reliable stiffening in the second pivot direction and, consequently, also a reliable power transmission in the push strand. Slight overstretching in the second pivot direction can here reliably prevent unintentional bending of the chain during power transmission in the push strand. For preventing unintentional bending of the chain in the second pivot direction, also a second spring element with one or two spring arms may, alternatively, be provided instead of a stiffening means, said second spring element obstructing a bending of the anti-backbend chain also in the second pivot direction.

According to a first solution, the chain link plates of neighboring chain links have end face-side support portions for stiffening the anti-backbend chain in the second pivot direction. The provision of end face-side support portions allows the chain to be stiffened in the second pivot direction without making use of additional function link plates. The chain link plates are here provided with support portions on the rear side facing the second pivot direction, said support portions overlapping such that bending of the chain in the second pivot direction is prevented. Such chain link plates with support portions for stiffening an anti-backbend chain in the second pivot direction are described e.g. in DE 10 2011 107 047 A1.

According to a second solution, stiffening link plates are provided, the respective stiffening link plates being arranged on at least one chain hinge and comprising end face-side support contours so as to stiffen the anti-backbend chain in the second pivot direction. Due to the formation of complementary support contours on both end faces of the stiffening link plates, the stiffening function will always take place in the plane of the stiffening link plates, so that the stiffening of the chain will not cause any lateral forces. In addition, conventional link plates can be used for all the other chain link plates of the chain links.

According to a preferred embodiment, the spring element may comprise a second spring arm, which extends to a second neighboring chain hinge and is movably in contact therewith under the biasing force of the spring element, so as to obstruct bending of the anti-backbend chain in the first pivot direction. A second spring arm extending from the spring element, which rests on a chain hinge, to a second neighboring chain hinge, which is positioned in opposed relationship with the first neighboring chain hinge, allows inherent securing of the chain hinge in the first pivot direction through the two spring arms, so that they can rest on the first or on the second neighboring chain hinge in a freely movable manner without being guided on the neighboring spring element.

According to an advantageous embodiment, the chain hinge comprises a hinge pin, the hinge pin extending through the spring element so as to join the spring element to the chain hinge. The spring element can thus be supported reliably, independently of a fixing of the spring element on the chain hinge. Especially when two spring arms are provided, the arrangement of the spring element around the hinge pin allows a flexible inherent bend protection.

The spring element may be configured as a torsion spring in a simple way. A torsion spring formed from a spring wire by means of bending allows, without any additional manufacturing steps being necessary, the formation of one or two spring arms as well as of a central opening for receiving therein the hinge pin of the chain hinge. Therefore, a torsion spring represents a particularly costs-efficient embodiment of a suitable spring element.

According to an expedient embodiment, the first spring arm and the second spring arm of the spring element abut freely on the two neighboring chain hinges and are arranged such that they are displaceable relative to the two neighboring chain hinges. The two spring arms can thus be slidingly arranged on the neighboring chain hinges of the supported chain hinge in an unfixed manner, so that they will be displaced on the neighboring chain hinge, when the anti-backbend chain bends while it is being deflected around an associated chain wheel. An unfixed positioning of the spring arms on the neighboring chain hinges or on the respective spring elements arranged on these chain hinges allows easy mounting without positioning the spring arms precisely in a suitable guide means.

According to a special embodiment, the chain links are alternately provided with stiffening link plates and the respective stiffening link plates are arranged on two neighboring chain hinges. The stiffening link plates can thus replace the conventional chain link plates of the respective chain links, so that the amount of material used as well as the width of the anti-backbend chain can be reduced.

According to a further embodiment, the stiffening link plates are configured as intermediate link plates, the intermediate link plates are arranged on a respective chain hinge, are positioned between the chain link plates of adjoining chain links and have complementary end face-side support contours. Stiffening link plates configured as intermediate link plates can be produced with a comparatively small wall thickness. The intermediate link plates can thus stiffen the anti-backbend chain in its second pivot direction reliably and in an essentially torsion-free manner.

The present invention additionally relates to a chain drive comprising one of the above-described embodiments of the anti-backbend chain according to the present invention and a chain wheel for deflecting the anti-backbend chain. In cooperation with the chain wheel, the anti-backbend chain is deflected in the first pivot direction against the biasing force of the spring element, without any lock being released. In the case of a linear drive of the anti-backbend chain, the chain wheel may only deflect the chain, optionally without engaging between the elements of the chain in a form-fit manner, or it may also serve to drive the chain in the case of a radial drive. When the chain runs off the chain wheel, it stretches automatically from the bent condition into the first pivot direction due to the biasing force of the spring element and allows thus power to be transmitted in the pushing direction of the chain.

BRIEF DESCRIPTION OF THE DRAWINGS

In the following, embodiments of the present invention will be explained in more detail making reference to drawings, in which:

FIG. 1 shows a perspective view of an anti-backbend chain according to the present invention, FIG. 2 shows a top view of the anti-backbend chain according to the present invention shown in FIG. 1, FIG. 3 shows a side view of the anti-backbend chain according to FIG. 1 in an exploded view, FIG. 5 shows a top view of a further anti-backbend chain according to the present invention, FIG. 6 shows a side view of the anti-backbend chain according to FIG. 5 in an exploded view.

DETAILED DESCRIPTION

Figure 4:
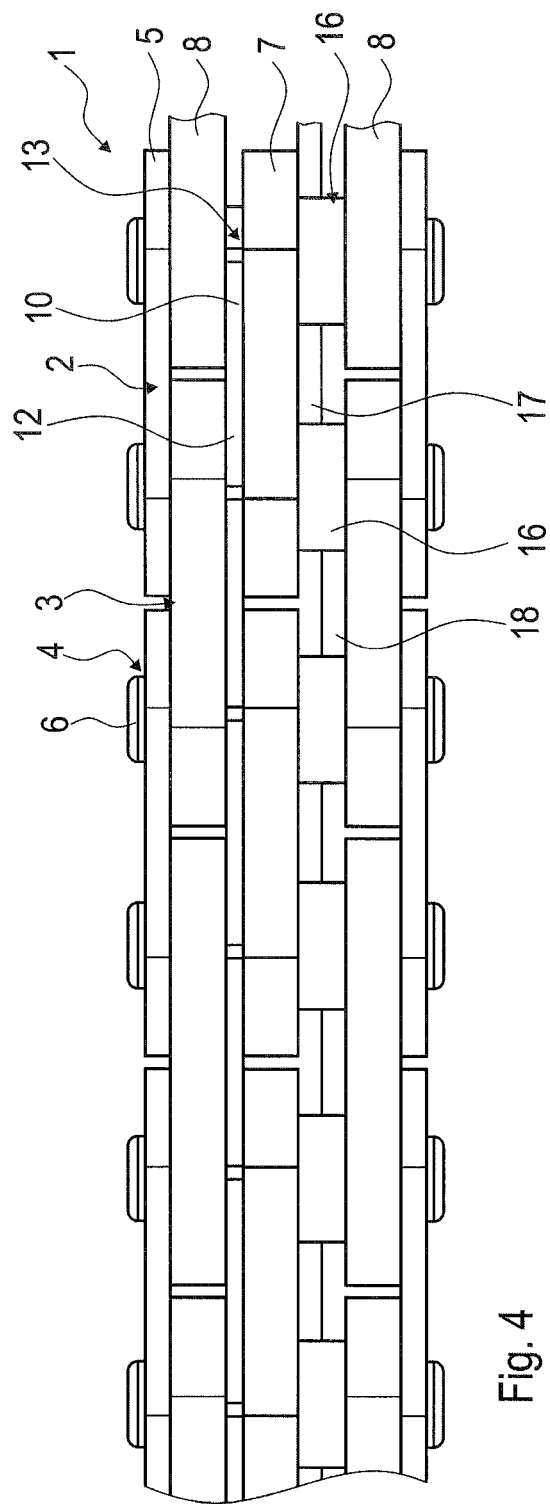
FIG. 4 shows an enlarged view of a detail of the anti-backbend chain according to FIG. 2.

The chain 1 with anti-backbend properties on the first and second sides, which is shown in FIG. 1, comprises alternate inner chain links 2 and outer chain links 3, which are joined via respective chain hinges 4. The outer chain links 3 comprise two outer link plates 5, which are spaced apart in parallel, as well as a central link plate 7 which is arranged substantially centrally between the outer link plates 5. The outer link plates 5 and the central link plate 7 are joined via a hinge pin 6 arranged perpendicularly thereto. The hinge pins 6 also extend at right angles to the longitudinal axis of the chain through the inner link plates 8 of the inner chain links 2. Each inner link plate 8 has two hinge openings 9 through which the hinge pin 6 extends and in which it is fittingly accommodated so as to allow pivoting of the inner chain links 2 relative to the outer chain links 3. The hinge pin 6 is press fitted into respective hinge openings (not shown) of the outer link plate 5. The anti-backbend chain 1 according to the present invention, which is shown in FIG. 1 as well as in the associated detailed representations in FIG. 2 to FIG. 4, is configured as a leaf chain structure without any bushes or rollers between the inner link plates 8.

Between the inner link plates 8 of the inner chain links 2 and the central link plates 7 of the outer chain links 3, intermediate link plates 10 are arranged. In the embodiment used here, the intermediate link plates 10 comprise a hinge opening 11 through which the hinge pin 6 extends, and, in addition, on the upper side 14 of the anti-backbend chain 1 shown in the top view according to FIG. 2, a protruding support contour 12 on a first end face of the intermediate link plates 10 as well as a recessed step 13 on the second end face of the intermediate link plate 10. The protruding support contour 12 on the first end face of the inner link plate 8 fits into the recessed step 13 on the second end face of the following inner link plate 8. As can clearly be seen in the partly exposed side view of the anti-backbend chain 1 in FIG. 3, the engagement of the above-mentioned support contour 12 of an intermediate link plate 10 with the recessed step 13 of the next intermediate link plate 10 on the upper side 14 allows the anti-backbend chain 1 to be stiffened in the second pivot direction, which is opposed to the direction of deflection around an associated chain wheel (not shown). The intermediate link plates 10 extend from the hinge opening 11 towards the support contour 12, so that the step 13 is formed substantially above the hinge opening 11 on the upper side 14. On the lower side 15 of the anti-backbend chain 1, which is in engagement with a chain wheel or a pulley in a chain drive, the intermediate link plate 10 ends in spaced relationship with the lower side 15 so as to save material in the production of the intermediate link plates 10 and avoid an inadvertent locking effect in the direction of the first pivot direction during deflection of the chain around the chain wheel or the pulley.

On the side of the central link plates 7 facing away from the intermediate link plates 10, a respective spring element 16 is provided between the central link plates 7 and the second inner link plate 8 of the inner chain link 2. Each of the spring elements 16 has a first spring arm 17 and a second spring arm 18. The spring element 16 is provided with a central opening 19 through which the hinge pin 6 of the respective chain hinge 4 extends. The first spring arm 17 and the second spring arm 18 extend from this chain hinge 4 to different sides (in the longitudinal direction of the chain) to the respective next chain hinge 4 and abut from the lower side 15 on the chain hinges 4 or on the respective spring elements 16 of these chain hinges 4 under the biasing force of the spring element 16. As can clearly be seen in FIG. 4, the first spring arm 17 of a spring element 16 and the second spring arm 18 of the following spring element 16 are arranged such that they are displaced relative to one another transversely to the direction of travel of the chain 1, so that they do not overlap and obstruct one another as regards their spring action. The first spring arm 17 of the spring element 16 is positioned on the spring element side facing the central link plates 7 and the second spring arm 18 of the spring elements 16 is positioned on the spring element side facing the inner link plates 8. In addition to the annular spring elements 16, which are clearly visible in FIG. 4, the spring elements 16 may also be configured as torsion springs that can be produced from a spring wire in one piece by means of bending. In the case of such a torsion spring the ends of the spring wire simultaneously define the two spring arms 17, 18 and the winding of the spring wire for establishing the biasing force acting on the two spring arms 17, 18 simultaneously defines the opening 19 used for receiving therein the hinge pin 6.

In the following, the mode of operation of the anti-backbend chain 1 will be explained in more detail, in particular on the basis of FIG. 3. The anti-backbend chain 1 shown in FIGS. 1 to 3 exhibits on the first and second sides the chain stiffening, which is necessary for power transmission in the push strand. The chain 1 is here stiffened on the upper side 14 by means of the intermediate link plates 10 so as to block the chain 1 in the second pivot direction. To this end, the support contour 12 protruding on the first end face of the intermediate link plates 10 engages the step 13 of the next intermediate link plate 10, said step 13 being formed above the hinge opening 11 of the intermediate link plates 10, so that further bending of the anti-backbend chain 1 in this second pivot direction is prevented.

In the direction of deflection around a chain wheel (not shown) of an associated chain drive, which is the first pivot direction, bending of the chain 1 with anti-backbend properties on the first and second sides is merely obstructed by the spring elements 16. The first spring arm 17 and the second spring arm 18 of the spring element 16 abut, under the biasing force of the spring element 16, from the lower side 15 of the chain 1 on the spring elements 16 arranged on the hinge pins 6 of the neighboring chain hinges 4. Although each of the two spring arms 17, 18 is in contact with the respective neighbouring chain hinge 4, they are neither fixed nor guided thereon. The two spring arms 17, 18 of the spring element 16 force the chain 1 in a direction opposite to the first pivot direction by means of the biasing force of the spring element 16 until the blocking caused by the intermediate link plates 10 prevents further movement in the direction of the second pivot direction. This has the effect that the anti-backbend chain 1 stretches in the longitudinal direction of the chain 1 thus allowing power transmission in the pushing direction. In addition, the biasing force of the spring elements 16 also prevents unintentional bending of the chain 1 with anti-backbend properties on the first and second sides.

If the chain is driven by means of a linear drive or by means of a radial drive with a driving chain wheel, the spring elements 16 allow, when the chain 1 with anti-backbend properties on the first and second sides is deflected around a chain wheel, a pulley or a guide means, free deflection against the force of the spring elements 16, i.e. deflection without releasing a lock on the anti-backbend chain 1 or without guidance in the push strand, which would otherwise be necessary. The resistance to bending of the anti-backbend chain 1 during deflection around a chain wheel, a pulley or a guide means can be adjusted by the biasing force imparted by the spring element 16 to the two spring arms 17, 18. The force required for deflecting the chain 1 in the first pivot direction around the chain wheel is applied by the driven chain wheel itself or by some other drive of the chain, so that the biasing force of the spring elements 16 stiffens the anti-backbend chain 1 automatically in the first pivot direction when the chain runs off the chain wheel.

A further embodiment of an anti-backbend chain 1 according to the present invention is shown in FIG. 5, where this anti-backbend chain 1 is configured as a classical bush chain or roller chain. Also this classical structural design comprises alternate inner chain links 2 and outer chain links 3, which are joined by respective chain hinges 4. Each of the inner chain links 2 comprises inner link plates 8 which are spaced apart in parallel, the two inner link plates 8 being joined by means of bushes 20. The hinge pin 6 of the chain hinge 4 extends through the bushes 20 of the inner link plates 8 so as to join the inner chain links 2 and the outer chain links 3. The hinge bush 20 of the inner chain link 2 is surrounded by a hinge roller 21 between the inner link plates 8 so as to reduce the wear of the chain hinge 4 when the chain engages a chain wheel associated therewith. The outer link plates 5 of the outer chain links 3 and the inner link plates 8 of the inner chain links 2 have provided between them a respective intermediate link plate 22 and a spring element 16 on both sides of the chain 1, the intermediate link plate 22 adjoining the outer link plate 5 and the spring element 16 adjoining the inner link plate 8.

The alternatively configured intermediate link plates 22 of this embodiment of an anti-backbend chain 1 according to the present invention are positioned between two respective hinge pins 6 and comprise two segment-shaped contours 23 for fixing the intermediate link plates 22 between the hinge pins 6, said segment-shaped contours 23 abutting on the hinge pins 6. A support contour 24, which adjoins the segment-shaped contours 23, is formed above the hinge pins 6. As can be seen in the partially exposed side view of the anti-backbend chain 1 in FIG. 6, the fact that the support contour 24 of an intermediate link plate 22 abuts on a complementary support contour 24 of an adjoining intermediate link plate 22 allows the anti-backbend chain 1 to be stiffened in a second pivot direction, which is opposed to a direction of deflection around an associated chain wheel (not shown). The support contours 24 of the intermediate link plates 22 extend here from the hinge pin 6 up to the upper side 14 of the anti-backbend chain 1. On the lower side 15 of the anti-backbend chain 1, which is in engagement with a chain wheel in a chain drive, the intermediate link plate 22 ends in spaced relationship with the lower side 15 and, starting from the hinge pin 6, it is additionally provided with beveled edges so as to avoid an inadvertent blocking effect in the direction of the first pivot direction.

Between the intermediate link plates 22 and the inner link plates 8 of the inner chain link 2 a respective spring element 16 is provided. Also in this embodiment, the spring elements 16 comprise a first spring arm 17 and a second spring arm 18, which extend from the receiving chain hinge 4 to different sides to the respective next chain hinge 4 and which abut, in a biased condition, from the lower side 15 on this chain hinge 4 or on the respective spring elements 16 provided thereon. As can clearly be seen in FIG. 5, the spring element 16 is configured as a torsion spring, so that the first spring arm 17 and the second spring arm 18 are displaced relative to one another in the direction of travel of the chain 1 and the spring arms 17, 18 of neighboring spring elements 16 do not overlap each other.

Figure 7:
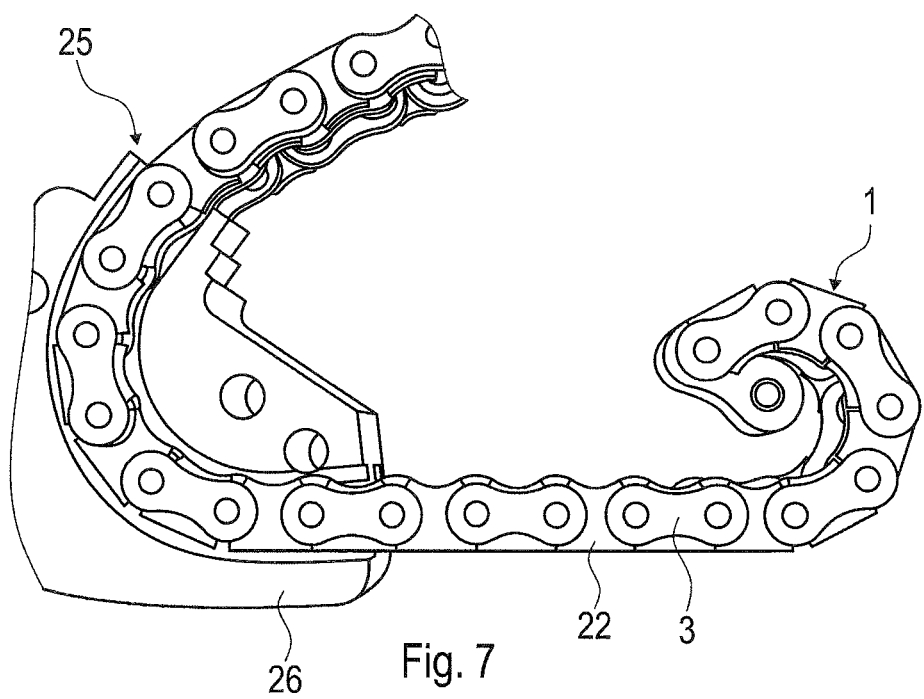
FIG. 7 shows a perspective top view of a chain drive with the anti-backbend chain according to FIG. 5.

FIG. 7 shows a perspective view of a chain drive 25 with a chain 1 with anti-backbend properties on the first and second sides, corresponding to the embodiment of a classical bush chain or roller chain shown in FIGS. 5 and 6, which is moved via a linear drive on one end thereof. In this chain drive 25, the chain 1 is bent by means of a deflection guide 26 in the first pivot direction and deflected in the direction of the desired pushing direction. When the chain runs off the deflection guide 26, the spring elements 16 cause the chain 1 to stretch and stiffen in the first pivot direction.

The invention claimed is:

1. An anti-backbend chain comprising a plurality of alternate chain links having chain link plates, wherein the chain link plates of neighbouring chain links are joined by respective chain hinges;
   wherein a spring element comprising at least a first spring arm is provided, the spring element obstruct bending of the anti-backbend chain in a first pivot direction, wherein the spring element encircles a chain hinge, the first spring arm extending from a first vertical side of the chain hinge to the first vertical side of a neighbouring chain hinge and is movably in contact therewith under the biasing force of the spring element; and
   wherein a stiffening means is provided, which stiffens the anti-backbend chain in a second pivot direction, and that, for defining the stiffening means, chain link plates of neighbouring chain links include support portions for stiffening the anti-backbend chain in the second pivot direction.

2. The anti-backbend chain as claimed in claim 1, wherein the spring element comprises a second spring arm, the second spring arm extending from the first vertical side of the chain hinge to the first vertical side of a second neighbouring chain hinge and is movably in contact therewith under the biasing force of the spring element, so as to obstruct bending of the anti-backbend chain in the first pivot direction.

3. The anti-backbend chain as claimed in claim 2, wherein the first spring arm and the second spring arm of the spring element abut freely on the two neighbouring chain hinges and are arranged such that they are displaceable relative to the two neighbouring chain hinges.

4. The anti-backbend chain as claimed in claim 2, wherein the first spring arm and the second spring arm are displaced relative to one another transversely relative to a direction of travel of the anti-backbend chain.

5. The anti-backbend chain as claimed in claim 1, wherein the chain hinge comprises a hinge pin, the hinge pin extending through the spring element so as to couple the spring element to the chain hinge.

6. The anti-backbend chain as claimed in claim 1, wherein the spring element is a torsion spring.

7. The anti-backbend chain as claimed in claim 1, wherein the first vertical side is one of a lower side or an upper side relative to a direction of travel of the anti-backbend chain.

8. The anti-backbend chain as claimed in claim 1, wherein the anti-backbend chain is configured for power transmission in a pushing direction.

9. The anti-backbend chain as claimed in claim 1, wherein the spring element encircles the chain hinge at least twice.

10. An anti-backbend chain comprising a plurality of alternate chain links having chain link plates, wherein the chain link plates of neighbouring chain links are joined by respective chain hinges;
   wherein a spring element comprising at least a first spring arm is provided, the spring element obstruct bending of the anti-backbend chain in a first pivot direction, wherein the spring element encircles a chain hinge, the first spring arm extending from a first vertical side of the chain hinge to the first vertical side of a neighbouring chain hinge and is movably in contact therewith under the biasing force of the spring element; and
   wherein stiffening link plates are provided, the respective stiffening link plates being arranged on at least one chain hinge and comprising end face-side support contours so as to stiffen the anti-backbend chain in the second pivot direction.

11. The anti-backbend chain as claimed in claim 10, wherein the chain links are alternately provided with stiffening link plates and that the respective stiffening link plates are arranged on two neighbouring chain hinges.

12. The anti-backbend chain as claimed in claim 10, wherein the stiffening link plates are configured as intermediate link plates, that the intermediate link plates are arranged on a respective chain hinge, are positioned between the chain link plates of adjoining chain links and have complementary end face-side support contours.

13. The anti-backbend chain as claimed in claim 10, wherein the spring element comprises a second spring arm, the second spring arm extending from the first vertical side of the chain hinge to the first vertical side of a second neighbouring chain hinge and is movably in contact therewith under the biasing force of the spring element, so as to obstruct bending of the anti-backbend chain in the first pivot direction.

14. The anti-backbend chain as claimed in claim 13, wherein the first spring arm and the second spring arm of the spring element abut freely on the two neighbouring chain hinges and are arranged such that they are displaceable relative to the two neighbouring chain hinges.

15. The anti-backbend chain as claimed in claim 10, wherein the first vertical side is one of a lower side or an upper side relative to a direction of travel of the anti-backbend chain.

16. The anti-backbend chain as claimed in claim 10, wherein the anti-backbend chain is configured for power transmission in a pushing direction.

17. A chain drive with an anti-backbend chain, the anti-backbend chain comprising:
   a plurality of alternate chain links having chain link plates, wherein the chain link plates of neighbouring chain links are joined by respective chain hinges;
   a spring element comprising at least a first spring arm, the spring element obstruct bending of the anti-backbend chain in a first pivot direction, wherein the spring element encircles a chain hinge, the first spring arm extending from a first vertical side of the chain hinge to the first vertical side of a neighbouring chain hinge and is movably in contact therewith under the biasing force of the spring element; and
   a stiffening means, which stiffens the anti-backbend chain in a second pivot direction.

18. The anti-backbend chain as claimed in claim 17, wherein the spring element comprises a second spring arm, the second spring arm extending from the first vertical side of the chain hinge to the first vertical side of a second neighbouring chain hinge and is movably in contact therewith under the biasing force of the spring element, so as to obstruct bending of the anti-backbend chain in the first pivot direction.

19. The anti-backbend chain as claimed in claim 17, wherein the first vertical side is one of a lower side or an upper side relative to a direction of travel of the anti-backbend chain.

20. The anti-backbend chain as claimed in claim 17, wherein the anti-backbend chain is configured for power transmission in a pushing direction.

* * * * *